US009829344B2

(12) United States Patent
King

(10) Patent No.: US 9,829,344 B2
(45) Date of Patent: Nov. 28, 2017

(54) CABLE ANGLE SENSOR

(71) Applicant: The Boeing Company, Chicago, IL (US)

(72) Inventor: Carl R. King, Mesa, AZ (US)

(73) Assignee: THE BOEING COMPANY, Chicago, IL (US)

( * ) Notice: Subject to any disclaimer, the term of this patent is extended or adjusted under 35 U.S.C. 154(b) by 387 days.

(21) Appl. No.: 14/662,002

(22) Filed: Mar. 18, 2015

(65) Prior Publication Data

US 2016/0273939 A1    Sep. 22, 2016

(51) Int. Cl.

| | | |
|---|---|---|
| *G01D 5/00* | (2006.01) | |
| *G01B 21/00* | (2006.01) | |
| *G01D 13/00* | (2006.01) | |
| *G01D 5/12* | (2006.01) | |
| *G01B 21/22* | (2006.01) | |

(52) U.S. Cl.
CPC .............. *G01D 5/12* (2013.01); *G01B 21/22* (2013.01)

(58) Field of Classification Search
CPC .................................. G01D 5/12; G01B 21/22
USPC ........................................................ 702/151
See application file for complete search history.

(56) References Cited

U.S. PATENT DOCUMENTS

| | | | | |
|---|---|---|---|---|
| 3,743,214 A | * | 7/1973 | Maciolek | G05D 1/104 244/17.13 |
| 3,746,279 A | * | 7/1973 | Maciolek | G05D 1/104 244/17.13 |
| 3,756,543 A | * | 9/1973 | Fowler | G05D 1/0858 244/17.13 |
| 3,833,189 A | * | 9/1974 | Fowler | G05D 1/0858 244/137.4 |
| 3,904,156 A | * | 9/1975 | Smith | B64D 1/22 212/273 |
| 4,780,838 A | | 10/1988 | Adelson | |
| 5,154,561 A | * | 10/1992 | Lee | B63B 27/12 114/264 |
| 7,035,758 B1 | * | 4/2006 | Jerome | B66C 13/04 702/150 |
| 8,000,835 B2 | | 8/2011 | Friz et al. | |
| 2004/0026349 A1 | * | 2/2004 | Colgate | B66C 17/00 212/284 |
| 2008/0017601 A1 | * | 1/2008 | Neupert | B66C 13/085 212/270 |
| 2010/0140412 A1 | * | 6/2010 | Certain | B64C 27/006 244/137.4 |

(Continued)

*Primary Examiner* — Moazzam Hossain
(74) *Attorney, Agent, or Firm* — Parsons Behle & Latimer

(57) ABSTRACT

An apparatus that includes a first member pivotably connected to a second member that is pivotably connected to a third member. The second member pivots about a first axis with respect to the first member and the third member pivots about a second axis with respect to the second member. The apparatus includes a first encoder configured to determine a first angle of rotation between the first member and the second member and a second encoder configured to determine a second angle of rotation between the second member and the third member. The first and second axes may be transverse to each other. The apparatus may be connected to a rotary aircraft with an object connected to the third member via a cable. The encoders may communicate with a display and/or a processor to display the location and/or movement of the object with respect to the rotary aircraft.

19 Claims, 8 Drawing Sheets

(56) References Cited

U.S. PATENT DOCUMENTS

| | | | | |
|---|---|---|---|---|
| 2011/0079678 A1* | 4/2011 | Brenner | ................ | B64C 27/001 244/17.13 |
| 2011/0137497 A1* | 6/2011 | Jimenez | ................ | B64D 45/00 701/3 |
| 2016/0184719 A1* | 6/2016 | D'Andrea | .............. | A63G 31/02 700/275 |

* cited by examiner

CABLE ANGLE SENSOR

BACKGROUND

Field of the Disclosure

The embodiments described herein relate to a system and method for determining the relative position of a load or object suspended from rotary aircraft.

Description of the Related Art

Rotary aircraft may be used to transport an item from one location to another location. The item, or load, is typically connected to the bottom of the rotary aircraft via a cable or line suspending the item from the aircraft as it travels between locations. During transport the load will often swing about changing the location of the load relative to the aircraft. Wind and the movement of the aircraft cause movement of the load below the aircraft. It is important for the operator of the rotary aircraft to know the location of the load when attempting to deliver the load at its final destination. It is also important to monitor the swinging movement of the load during transport as too much movement may create a dangerous situation for the rotary aircraft and potential ground personnel. The operator of the rotary aircraft may not be able to visually monitor the position and/or swinging movement of the load because it is positioned below the rotary aircraft. Thus, it may be beneficial to provide an apparatus and/or system that may be used to permit the monitoring the position and/or swinging movement of the load.

SUMMARY

The present disclosure is directed to a method and system that overcomes some of the problems and disadvantages discussed above.

One embodiment supported by the disclosure is an apparatus comprising a first member and a second member connected to the first member, the second member configurable to pivot about a first axis with respect to the first member. The apparatus comprises a first encoder configured to determine a first angle of rotation between the first member and the second member. The apparatus comprises a third member connected to the second member, the third member configurable to pivot about a second axis with respect to the second member. The apparatus comprises a second encoder configured to determine a second angle of rotation between the second member and the third member.

The first axis may be transverse to the second axis. The apparatus may include a first hinge pin pivotably connecting the first member to the second member and a second hinge pin pivotably connecting the second member to the third member. The apparatus may include a first coupler that couples the first hinge pin to the first encoder and a second coupler that couples the second hinge pin to the second encoder. The apparatus may include a bracket connected to a top surface of the first member. The third member may include an attachment point for a cable. The first member may include a first projection and the second member may include a second projection and a third projection, wherein the first projection is positioned between the second and third projections.

Another embodiment supported by the disclosure is a system comprising a first member and a second member connected to the first member, the second member configurable to pivot about a first axis with respect to the first member. The system comprises a first encoder configured to determine a first angle of rotation between the first member and the second member. The system comprises a third member connected to the second member, the third member configurable to pivot about a second axis with respect to the second member. The system comprises a second encoder configured to determine a second angle of rotation between the second member and the third member and a display in communication with the first and second encoders, the display being configured to display a position of an object connected to the third member via a cable.

The system may include a processor configured to determine the position of the object, the processor being in communication with the display and the first and second encoders. The system may include a rotary aircraft with the first member being connected to a lower portion of the rotary aircraft. The first axis may be transverse to the second axis. The display may display the position of the object connected to the third member relative to the rotary aircraft. The first and second encoders may communicate wirelessly with the processor. The system may include a first hinge pin pivotably connecting the first member to the second member and a second hinge pin pivotably connecting the second member to the third member. The system may include a first coupler the couples the first hinge pin to the first encoder and a second coupler that couples the second hinge pin to the second encoder.

Another embodiment supported by the disclosure is a method of monitoring a load. The method comprises connecting a first member to a second member, wherein the second member is configurable to pivot along a first axis with respect to the first member. The method comprises connecting the second member to a third member, wherein the third member is configurable to pivot along a second axis with respect to the second member, the second axis being transverse to the first axis. The method comprises measuring a rotation of the second member with respect to the first member about the first axis with a first encoder and measuring a rotation of the third member with respect to the second member about the second axis with a second encoder.

The method may include connecting the first member to a rotary aircraft. The method may include communicating rotation data measured from the first and second encoders to a display in an interior of the rotary aircraft. The method may include displaying a position of an object connected to the third member via a cable on the display based on the rotational data measured from the first and second encoders. The rotational data may be communicated wirelessly from the first and second encoders to a processor connected to the display.

Figure 1:
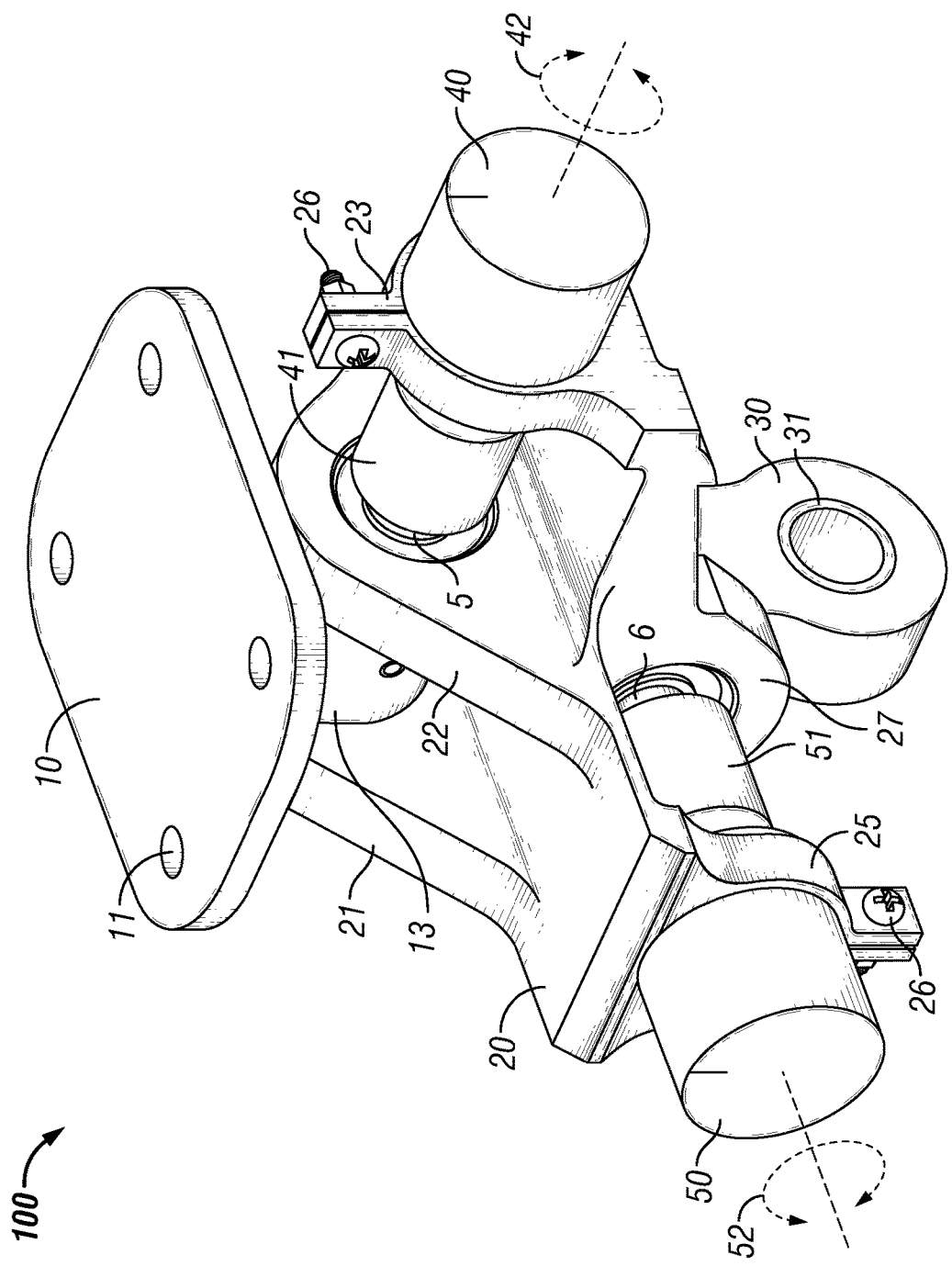
FIG. 1 is one example of a cable angle sensor.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

Figure 2:
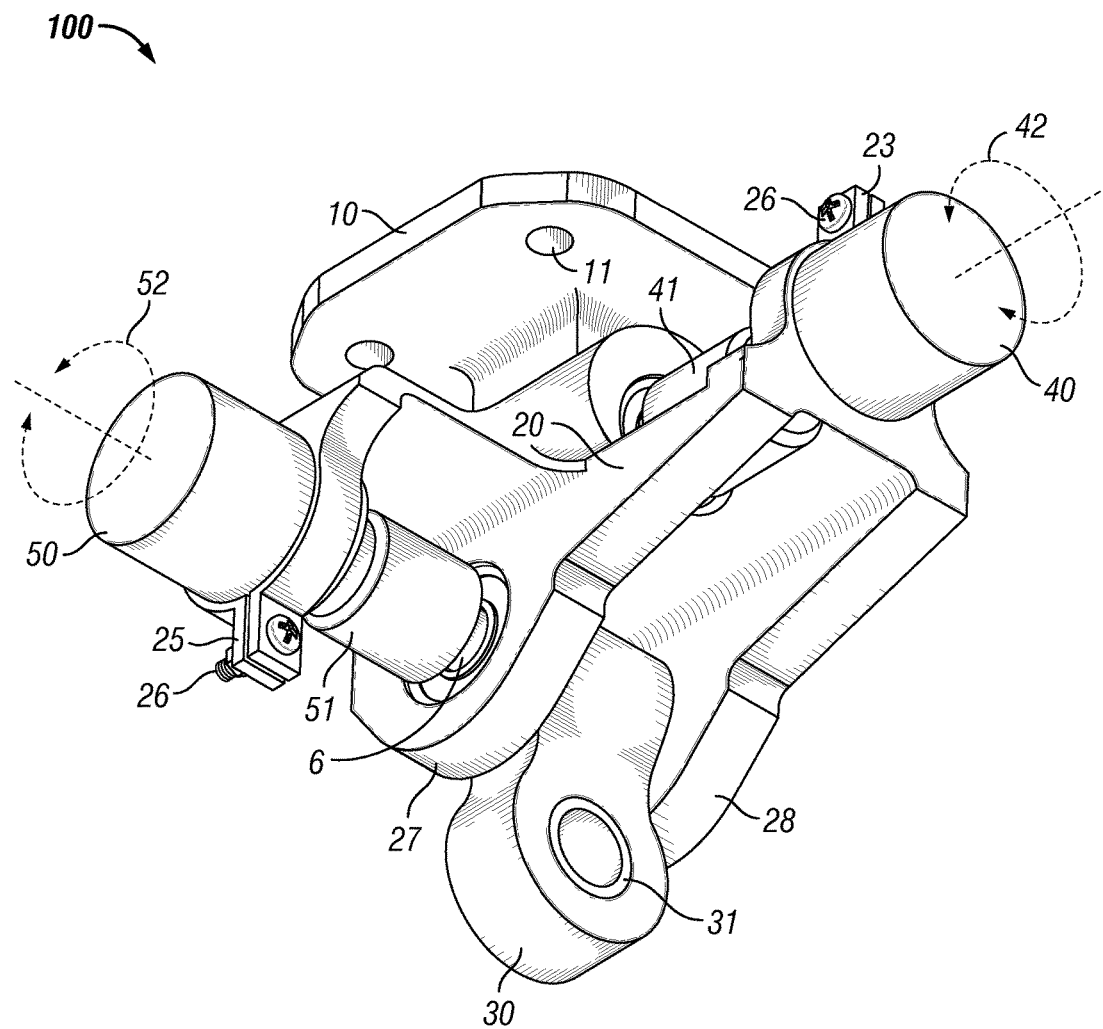
FIG. 2 is a bottom isometric view of the cable angle sensor of FIG. 1.

FIG. 1 shows an example an apparatus, also referred to as a cable angle sensor, 100. FIG. 2 shows a bottom isometric view of the apparatus 100 of FIG. 1. As detailed herein, the cable angle sensor 100 may permit the determination of the position of a load 300 (shown in FIG. 6) connected via the cable angle sensor 100 to a rotary aircraft 200 (shown in FIG. 6) by a cable 250 (shown in FIG. 6). The apparatus 100 includes a first member 10, second member 20, and a third member 30. The first member 10 is pivotably connected to the second member 20 so that the second member 20 may pivot or rotate with respect to the first member 10 about a first axis 42. Likewise, the second member 20 is pivotably connected to the third member 30 so that the third member 30 may pivot or rotate with respect to the second member 20 about a second axis 52. The first axis 42 is transverse and generally perpendicular with the second axis 52 to monitor the movement of a load 300 (shown in FIG. 6) suspended from the third member 30 in the two axes with respect to the apparatus 100 as discussed herein.

Figure 6:
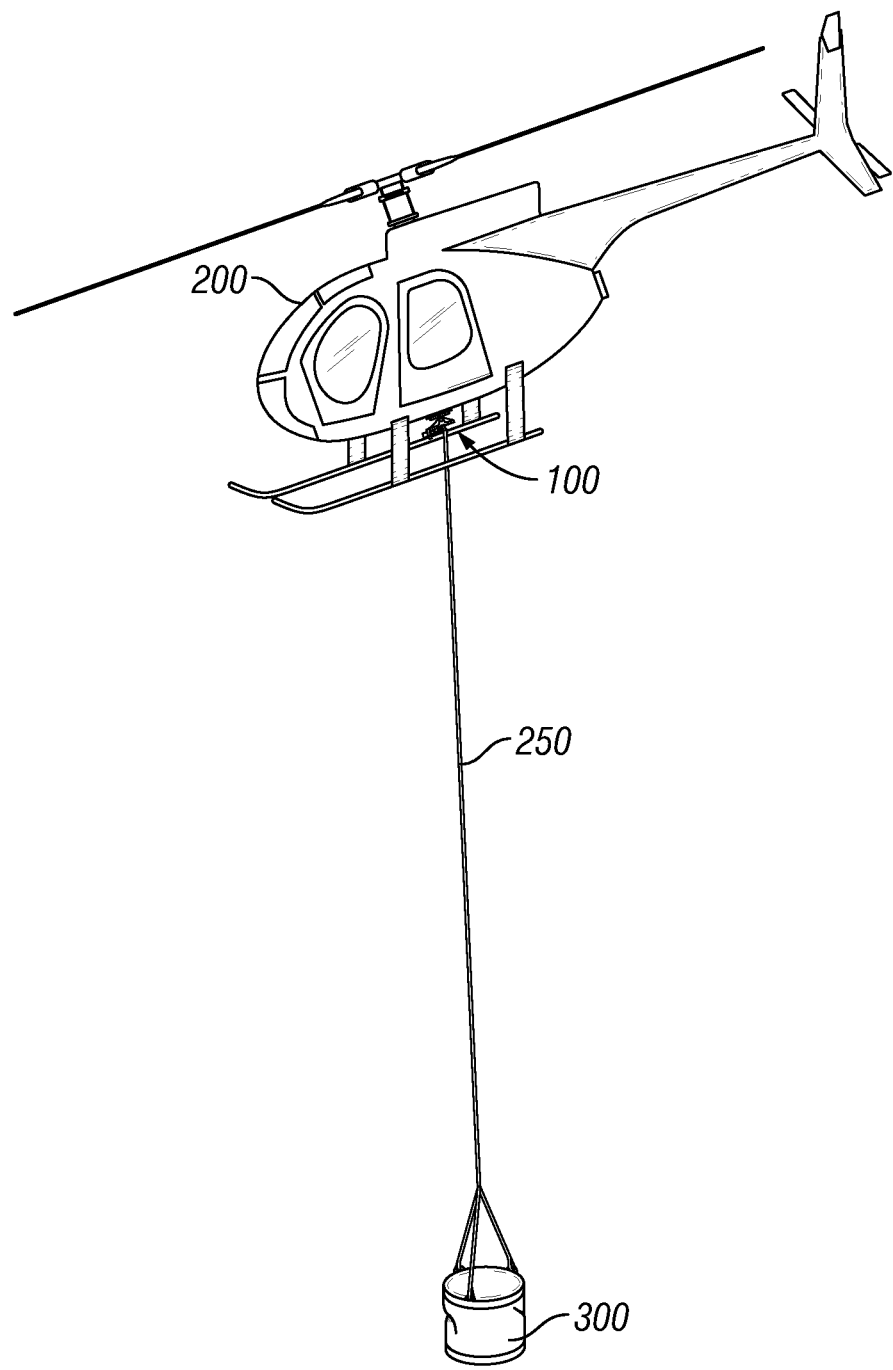
FIG. 6 is one example of a cable angle sensor connecting a load to a rotary aircraft.

The first member 10 of the apparatus 100 is adapted to permit the connection of the first member 10 to a rotary aircraft 200 (shown in FIG. 6). For example, the first member 10 may include a plurality of apertures or holes 11 that permit insertion of fasteners to secure the first member to the rotary aircraft 200 (shown in FIG. 6). Alternatively, the first member 10 may be connected to a bracket 210 (shown in FIG. 3), which in turn may be secured to the rotary aircraft, as shown in FIG. 4. The first member 10 of the apparatus 100 is rotatably or pivotably connected to the second member 20 of the apparatus 100. For example, a hinge pin 5 may be used to connect the first member 10 to the second member 20 that permits the rotation of the second member 20 to the first member 10 about a first axis 42. Various mechanisms and/or methods may be used to rotatably or pivotably connect the first member 10 to the second member 20 as would be appreciated by one of ordinary skill in the art having the benefit of this disclosure.

The first member 10 may include a first protrusion 13 that extends towards the second member 20. The second member may include a second protrusion 21 and a third protrusion 22 that both extend towards the first member 10. The first protrusion 13 of the first member 10 may be positioned between the second and third protrusions 21 and 22 of the second member 20, which may aid coupling the first member 10 to the second member 20. A first hinge pin 5 may rotatably connect the first member 10 to the second member 20 by being positioned through the first, second, and third protrusions 13, 21, and 22. A first encoder 40 may be used to measure the rotation of the second member 20 with respect to the first member 10 about a first axis 42. A first coupler 41 may couple the first encoder 40 to the first hinge pin 5 to detect rotational movement between the first and second members 10 and 20 about the first axis of rotation 42. The first encoder 40 may be connected to the second member 20 via a flange 23 and fastener 26. The shape and configuration of the first member 10, second member 20, and encoder 40 is for illustrative purposes and may be varied within the scope of this disclosure as would be appreciated by one of ordinary skill in the art having the benefit of this disclosure. For example, the first hinge pin 5 may be fixed to the first member 10 and the first encoder 40 may be fixed to the second member 20 and the first encoder 40 measures the rotation between the first and second members 10 and 20.

The third member 30 of the apparatus 100 is rotatably or pivotably connected to the second member 20 of the apparatus 100. For example, a hinge pin 6 may be used to connect the third member 30 to the second member 20 that permits the rotation of the third member 30 to the second member 20 about a second axis 52. The hinge pin 6 may be positioned through fourth and fifth protrusions 27 and 28 (shown in FIG. 2) of the second member 20 that extends away from the first member 10. The third member 30 may include an aperture 31 to permit the connection of a cable 250 (shown in FIG. 6). Various mechanisms and/or methods may be used to rotatably or pivotably connect the third member 30 to the second member 20 as would be appreciated by one of ordinary skill in the art having the benefit of this disclosure.

A second encoder 50 may be used to measure the rotation of the third member 30 with respect to the second member 20 about the second axis 52. A second coupler 51 may couple the second encoder 50 to the second hinge pin 6 to detect rotational movement between the second and third members 20 and 30 about the second axis of rotation 52. The second encoder 50 may be connected to the third member 30 via a flange 25 and fastener 26. The shape and configuration of the second member 20, third member 30, and encoder 50 is for illustrative purposes and may be varied within the scope of this disclosure as would be appreciated by one of ordinary skill in the art having the benefit of this disclosure. For example, the second hinge pin 6 may be fixed to the third member 30 and the second encoder 50 may be fixed to the second member 20 and the second encoder 50 measures the rotation between the second and third members 20 and 30.

As discussed above, FIG. 2 shows a bottom isometric view of the apparatus 100 of FIG. 1. The third member 30 of the apparatus 100 may be positioned between the fourth and fifth protrusions 27 and 28 of the second member 20 that extend away from the first member 10. The second hinge pin 6 may be positioned through fourth and fifth protrusions 27 and 28 such that the third member 30 may pivot or rotate with respect to the second member 20 about the second axis 52. The second encoder 50 may be coupled to the second hinge pin 6 via a coupler 51. The second encoder 50 is configured to measure the pivoting or rotating movement between the second and third members 20 and 30 about the second axis 52. The shape and configuration of the second member 20, third member 30, and encoder 50 is for illustrative purposes and may be varied within the scope of this disclosure as would be appreciated by one of ordinary skill in the art having the benefit of this disclosure.

Figure 3:
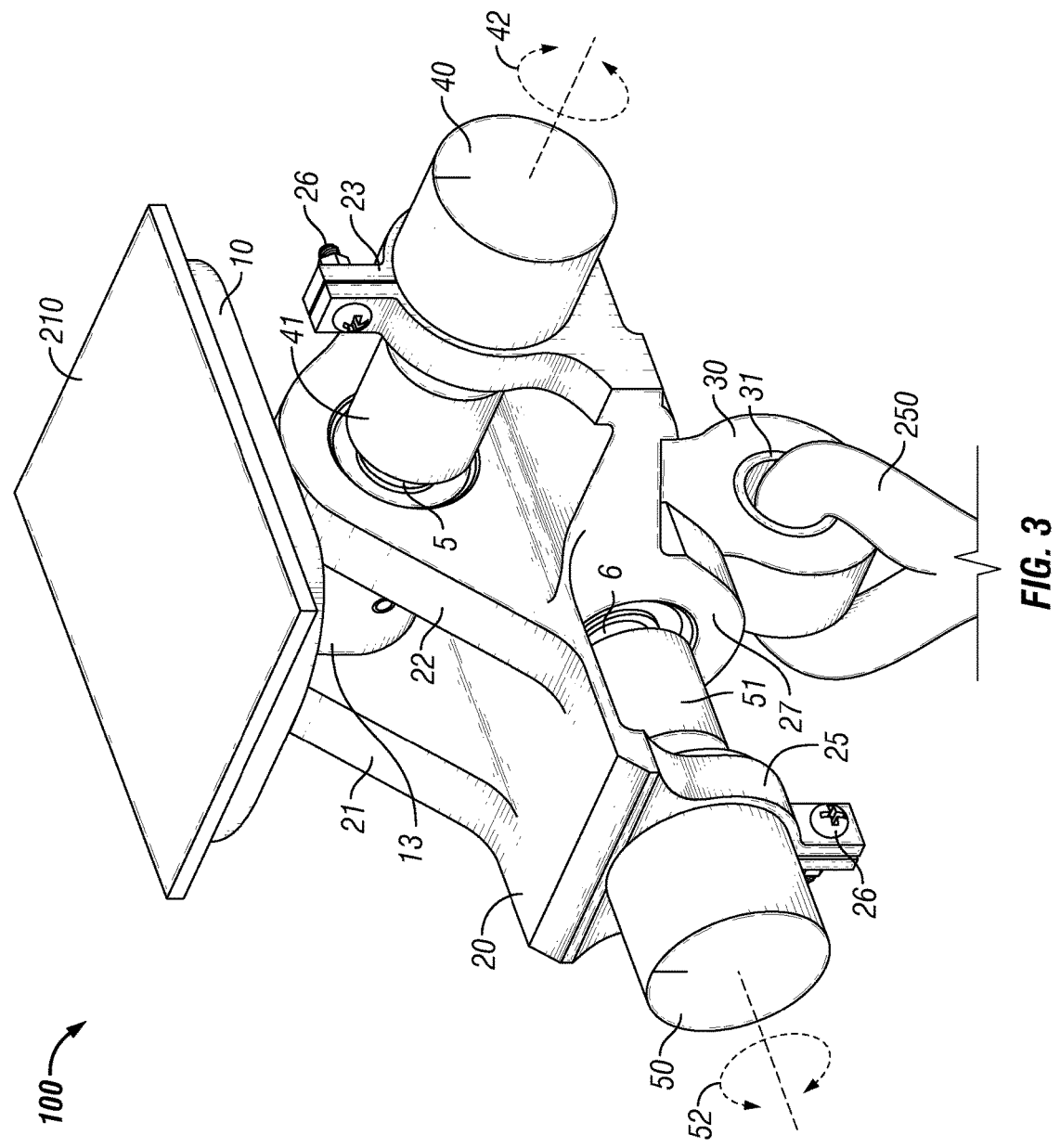
FIG. 3 is one example of a cable angle sensor with a bracket attached to a top surface of the device and a cable connected to a bottom portion of the device.
Figure 4:
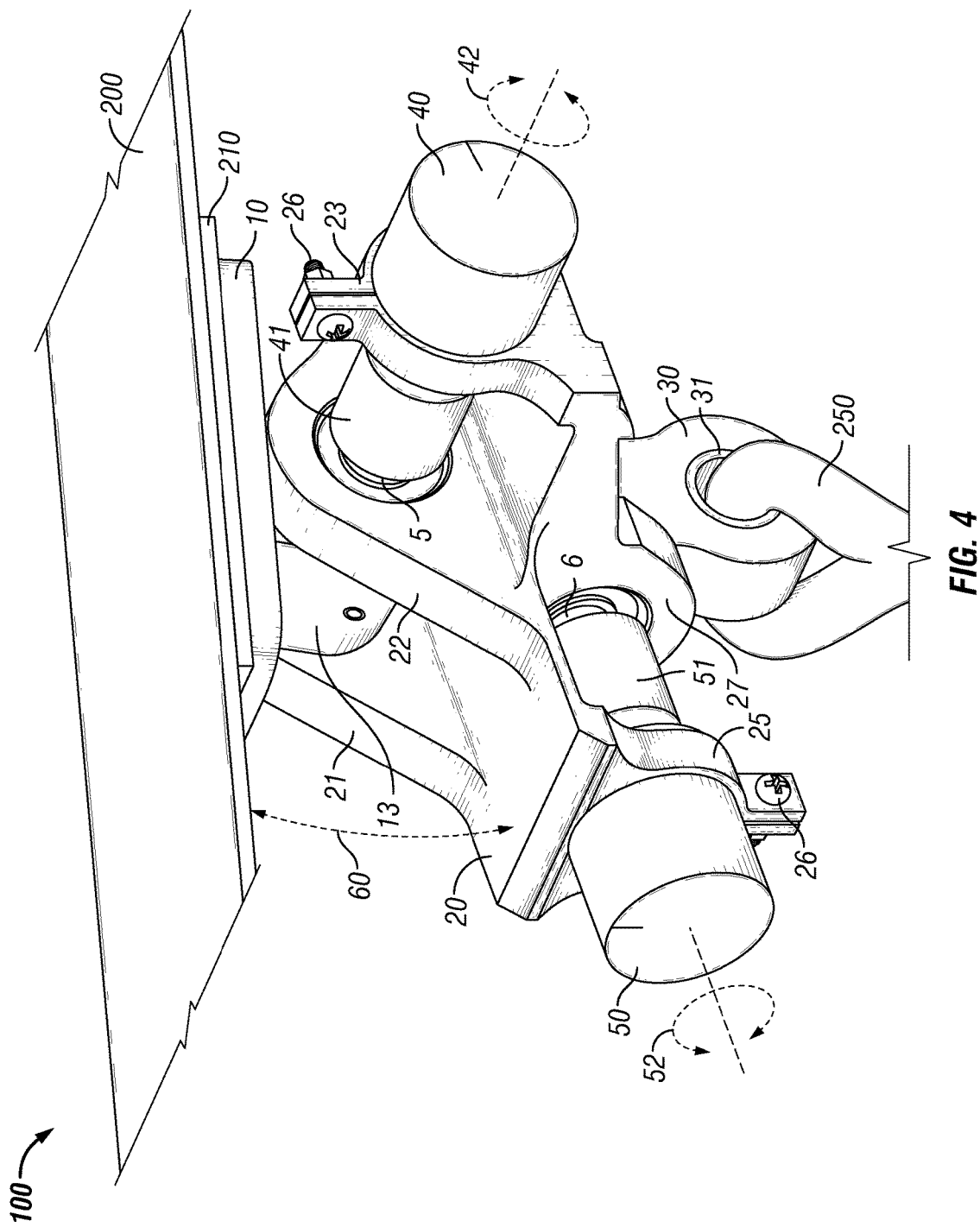
FIG. 4 is one example of a cable angle sensor with an angle or rotation about a first axis being measured by a first encoder.

FIG. 3 shows a bracket 210 connected to the top surface of the first member 10. The bracket 210 may be used to connect the apparatus 100 to a rotary aircraft 200 (shown in FIG. 6). Alternatively, the first member 10 may be configured to be connected directly to the rotary aircraft 200. A cable 250 may be connected to the third member 30 via aperture 31. The configuration of the cable 250 and the third member 30 is shown for illustrative purposes and may be varied as would be appreciated by one of ordinary skill in the art having the benefit of this disclosure.

FIG. 4 shows apparatus 100 connected to a portion of a rotary aircraft 200 via bracket 210. As discussed above, the apparatus 100 may be configured to be connected directly to the rotary aircraft 200. As discussed above, the second member 20 may pivot or rotate with respect to the first member 10 about the first axis 42. FIG. 4 shows that the second member 20 has moved with respect to the first member 10 as indicated by angle 60. The rotation of the hinge pin 5 is measured by encoder 40 via the coupler 41. The measurement of rotation determined by the encoder 40 may be communicated to a system used to determine the location of a load 300 (shown in FIG. 6) connected to the rotary aircraft 200 via the cable 250. Thus, the encoder 40 may able to monitor movement of the load 300 in a first axis with respect to the connection point to the rotary aircraft 200.

Figure 5:
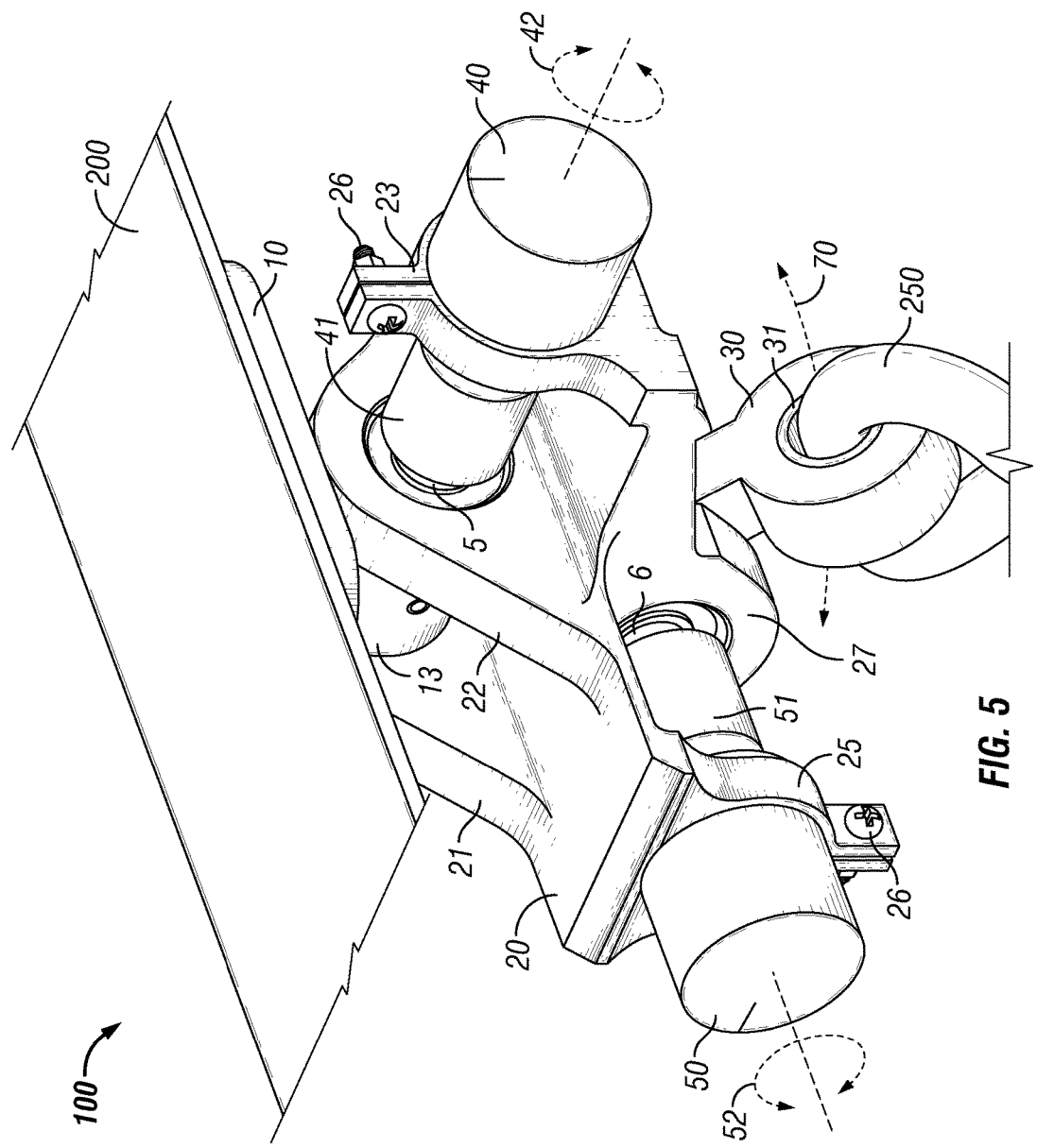
FIG. 5 is one example of a cable angle sensor with an angle or rotation about a second axis being measured by a second encoder.

FIG. 5 shows apparatus 100 connected directly to a portion of a rotary aircraft 200. As discussed above, the apparatus 100 may be configured to be connected directly to the rotary aircraft 200 or via a bracket 210, as shown in FIG. 4. As discussed above, the third member 30 may pivot or rotate with respect to the second member 20 about the second axis 52. FIG. 5 shows that the third member 30 has moved with respect to the second member 20 as indicated by angle 70. The rotation of the hinge pin 6 is measured by encoder 50 via the coupler 51. The measurement of rotation determined by the encoder 50 may be communicated to a system used to determine the location of a load 300 (shown in FIG. 6) connected to the rotary aircraft 200 via the cable 250. Thus, the encoder 50 may able to monitor movement of the load 300 in a second axis with respect to the connection point to the rotary aircraft 200. The measured data from the first and second encoders 40 and 50 may be transmitted to a processing system 225 (shown in FIG. 8) with the rotary aircraft 200 via wire or wirelessly as would be appreciated by one of ordinary skill in the art having the benefit of this disclosure. The processing system 225 may be able to determine the position of the load 300 with respect to the aircraft 200 based on information from the first encoder 40 about rotational movement about the first axis and based on information from the second encoder 50 about rotation movement about the second axis, which is transverse to the first axis.

FIG. 6 shows a load 300 connected to a rotary aircraft 200 via a cable 250 connected a cable angle sensor 100 attached to the rotary aircraft 200. The operator of the rotary aircraft 200 may not be able to see the relative position of the load 300 because of its location underneath the aircraft 200. The cable angle sensor 100 will be able to provide positional data to a processing system 225 within the aircraft 200 to inform the operator the position of the load 300. The positional information may be displayed on a display 220 (shown in FIG. 7) in the interior of the aircraft 200. The movement of the second member 20 and third member 30 of the cable angle sensor 100 will be monitored by the encoders 40 and 50. The processing system 225 within the aircraft will interpolate the encoder data to determine the position of the load 300 relative to the aircraft 200.

Figure 7:
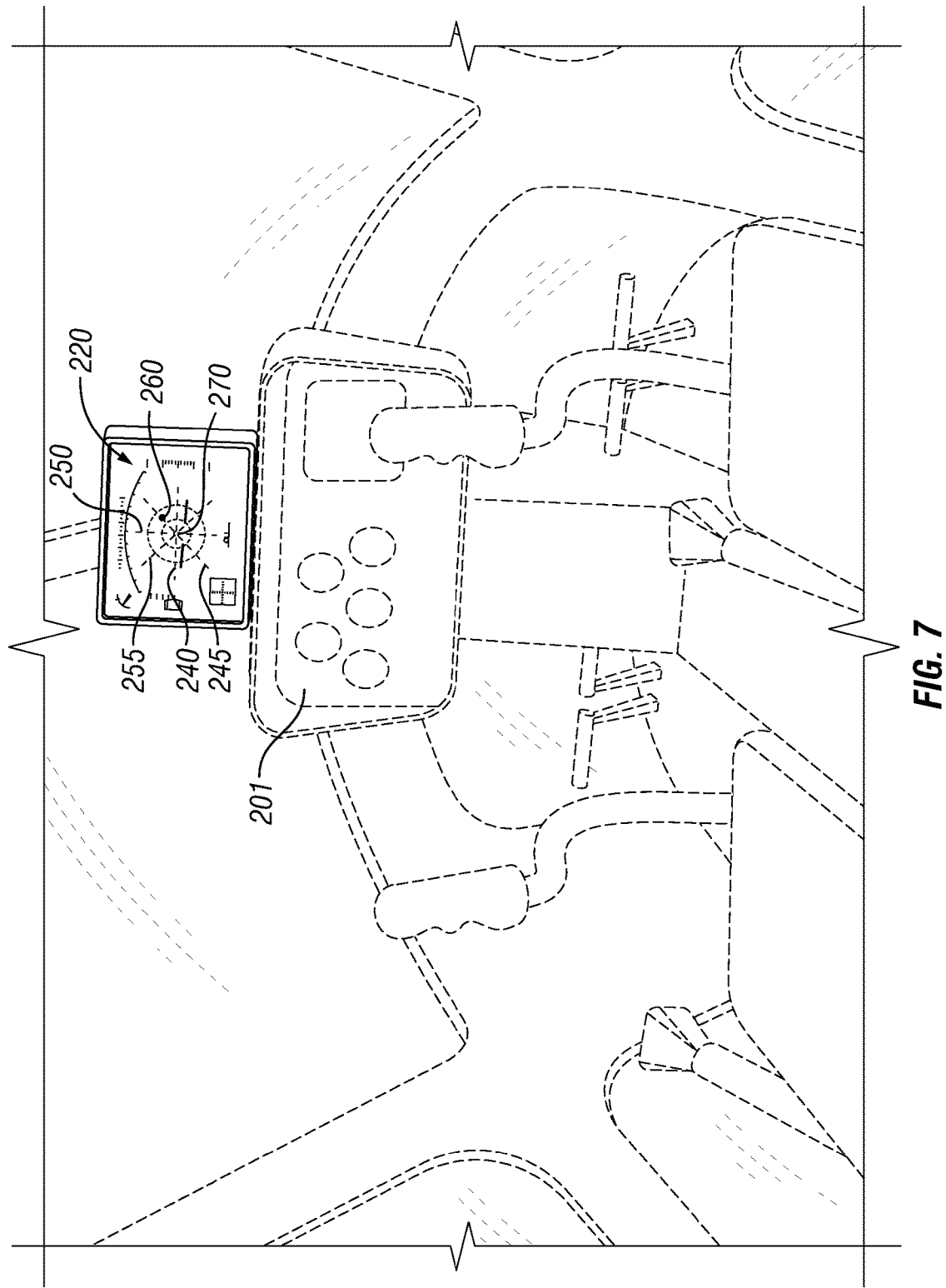
FIG. 7 is one example of a display within an interior of a rotary aircraft that indicates the position of a load connected to a cable angle sensor.

FIG. 7 shows a portion of an interior of a rotary aircraft 200. A display 220 includes a screen indicating the position of a load 300 may be located on a portion of a dash 201 of the aircraft 200. A processing system 225 receives data from the first and second encoders 40 and 50 and provides positional information of the load 300 on the display 220. The processing system or processor 225 may be integrated with the display 220. The display 220 may include an indicator 260 that indicates the location of the load 300. The screen 220 may include indicators such as dashed lines 240 and 250 that correspond to the first and second axes 42 and 52. The screen 220 may also include dashed lines 245 and 255 that indicate forty-five degrees between the axes. The screen 220 also includes an indicator 270 that indicates the position located directly below the cable angle sensor 100 connected to the bottom of the rotary aircraft 200. The operator of the rotary aircraft 200 may use the indicators 240, 245, 250, 255, and 270 to determine the relative location of the load 300 represented by indicator 260. The operator of the rotary aircraft 200 may also monitor the screen 220 to determine the relative movement of the load 300 with respect to the rotary aircraft 200. The layout and configuration of the display 220 and indicators 240, 245, 250, 255, 260, and 270 is for illustrative purposes only and may be varied within the scope of this disclosure as would be appreciated by one of ordinary skill in the art having the benefit of this disclosure. Further, the display 220 can be integrated within the instrumentation of the aircraft 200 or could be a standalone device such as a tablet, mounted electronic device, or hand held device as would be appreciated by one of ordinary skill in the art having the benefit of this disclosure.

Figure 8:
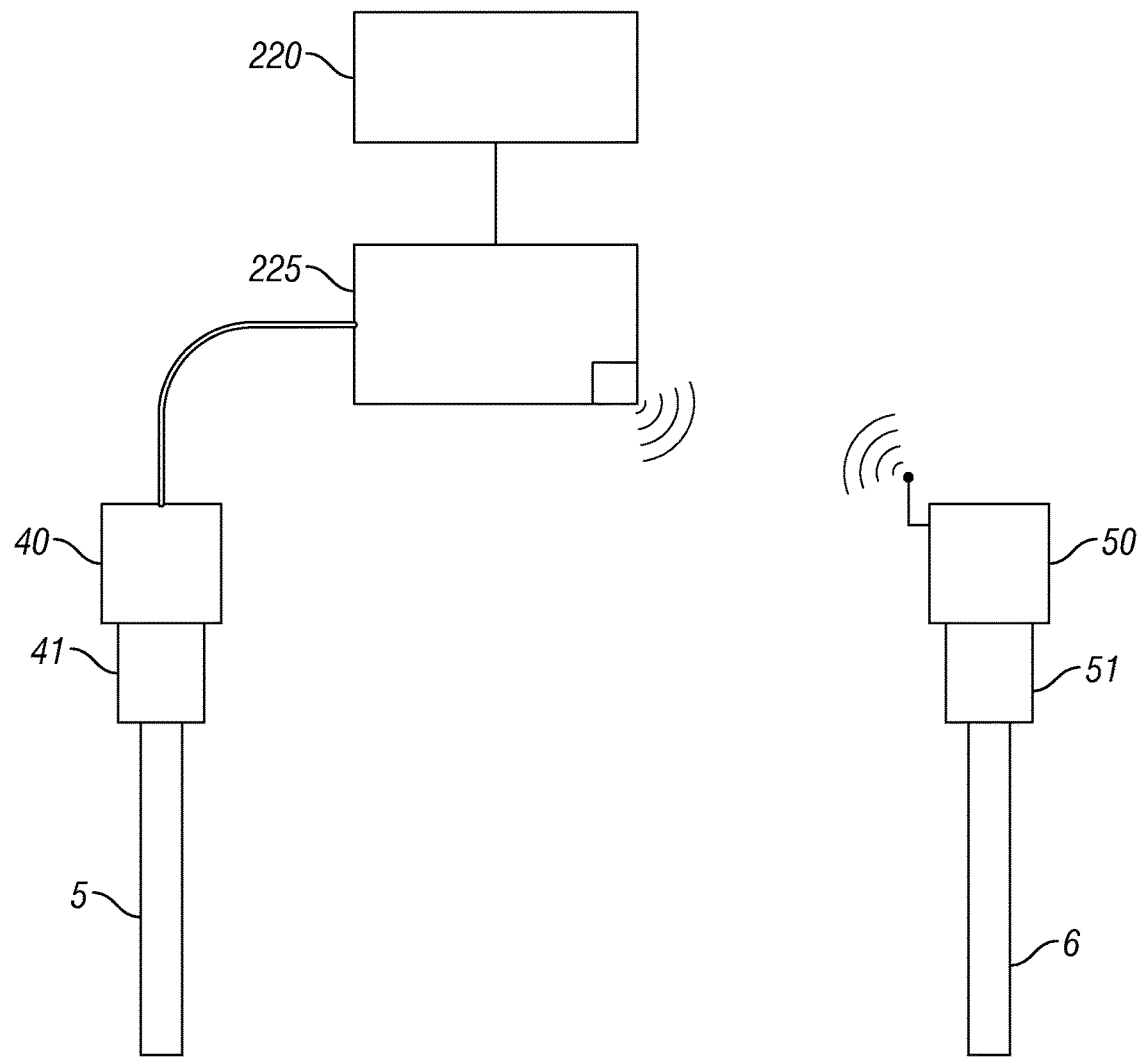
FIG. 8 shows a schematic of a system that that may be used to determine the relative position and/or movement of a load suspended from a rotary aircraft.

FIG. 8 shows a schematic of a system that that may be used to determine the relative position and/or movement of a load 300 suspended from a rotary aircraft 200. A first encoder 40 is coupled with a hinge pin 5 via a coupler 41. The first encoder 40 measures the rotation of the hinge pin 5 to determine the rotational movement about a first axis. The first encoder 40 is in communication with a processor 225. The first encoder 40 may be wired to the processor 225 as shown in FIG. 8. A second encoder 50 is coupled with a hinge pin 6 via a coupler 51. The second encoder 50 measures the rotation of the hinge pin 6 to determine the rotational movement about a second axis. The second encoder 50 is in communication with a processor 225. The second encoder 50 may communicate wirelessly to the processor 225 as shown in FIG. 8. The processor 225 may use the data from the encoders 40 and 50 and output the relative position of the load to a display 220 connected to the processor 225. As discussed above, an operator of a rotary aircraft 200 may view the display 220 to determine the relative position and/or movement of a load 300 connected to the rotary aircraft 200 via the cable angle sensor 100.

Although this disclosure has been described in terms of certain preferred embodiments, other embodiments that are apparent to those of ordinary skill in the art, including embodiments that do not provide all of the features and advantages set forth herein, are also within the scope of this disclosure. Accordingly, the scope of the present disclosure is defined only by reference to the appended claims and equivalents thereof.

What is claimed is:

1. An apparatus comprising:
   a first member having a first protrusion;
   a second member having a second protrusion, a third protrusion, a fourth protrusion, and a fifth protrusion, the second member connected to the first member, the second member configurable to pivot about a first axis with respect to the first member, wherein the second and third protrusions extend from the second member towards the first member and the first protrusion is positioned between the second and third protrusions, and wherein the fourth and fifth protrusions extend from the second member away from the first member;

a first encoder configured to determine a first angle of rotation between the first member and the second member;

a third member connected to the second member with a portion of the third member being positioned between the fourth and fifth protrusions, the third member configurable to pivot about a second axis with respect to the second member; and a second encoder configured to determine a second angle of rotation between the second member and the third member.

2. The apparatus of claim 1, wherein the first axis is transverse to the second axis.

3. The apparatus of claim 2, further comprising a first hinge pin pivotably connecting the first member to the second member and a second hinge pin pivotably connecting the second member to the third member.

4. The apparatus of claim 3, further comprising a first coupler that couples the first hinge pin to the first encoder and a second coupler that couples the second hinge pin to the second encoder.

5. The apparatus of claim 4, further comprising a bracket connected to a top surface of the first member.

6. The apparatus of claim 4, wherein the third member further comprises an attachment point for a cable.

7. A system comprising:
a first member;
a second member connected to the first member via a first hinge pin, the second member configurable to pivot about a first axis with respect to the first member;
a first coupler;
a first encoder configured to determine a first angle of rotation between the first member and the second member, wherein the first coupler is positioned between the first encoder and the first hinge pin and couples the first encoder to the first hinge pin;
a third member connected to the second member via a second hinge pin, the third member configurable to pivot about a second axis with respect to the second member;
a second coupler;
a second encoder configured to determine a second angle of rotation between the second member and the third member, wherein the second coupler is positioned between the second encoder and the second hinge pin and couples the second encoder to the second hinge pin; and
a display in communication with first encoder and in communication with the second encoder, the display being configured to display a position of an object connected to the third member via a cable.

8. The system of claim 7, further comprising a processor configured to determine the position the object, the processor being in communication with the display and the first and second encoders.

9. The system of claim 8, further comprising a rotary aircraft, the first member being connected to a lower portion of the rotary aircraft.

10. The system of claim 9, wherein the first axis is transverse to the second axis.

11. The system of claim 10, wherein the display displays the position of the object connected to the third member relative to the rotary aircraft.

12. The system of claim 10, wherein the first encoder and the second encoder communicate wirelessly with the processor.

13. A method of monitoring a load comprising:
inserting a first hinge pin through a first protrusion of a first member and through second and third protrusions of a second member to connect the first member to the second member, wherein the second member is configurable to pivot along a first axis with respect to the first member;
inserting a second hinge pin through fourth and fifth protrusions of the second member and through a third member to connect the second member to the third member, wherein the third member is configurable to pivot along a second axis with respect to the second member, the second axis being transverse to the first axis;
connecting a first encoder to the first hinge pin via a first coupler positioned between the first encoder and the first hinge pin, wherein the first encoder is configured to measure a rotation of the second member with respect to the first member about the first axis; and
connecting a second encoder to the second hinge pin via a second coupler positioned between the second encoder and the second hinge pin, wherein the second encoder is configured to measure a rotation of the third member with respect to the second member about the second axis.

14. The method of claim 13, further comprising connecting the first member to a rotary aircraft.

15. The method of claim 14, further comprising communicating rotational data measured from the first and second encoders to a display in an interior of the rotary aircraft.

16. The method of claim 15, further comprising displaying a position of an object connected to the third member via a cable on the display based on the rotational data.

17. The method of claim 16, wherein the rotational data is communicated wirelessly from the first and second encoders to a processor connected to the display.

18. The apparatus of claim 3, wherein the first hinge pin extends through the first, second, and third protrusions and wherein the second hinge pins extends through the fourth and fifth protrusions and the third member.

19. The apparatus of claim 18, further comprising a first coupler positioned between the first hinge pin and the first encoder, the first coupler couples the first hinge pin to the first encoder and a second coupler positioned between the second hinge pin and the second encoder, the second coupler couples the second hinge pin to the second encoder.

* * * * *